Dec. 20, 1960   M. M. YAN ET AL   2,964,792
SYNTHETIC LUMBER PRESSURE SLAM
Filed Oct. 21, 1955   2 Sheets-Sheet 1

Inventors
Maxwell M. Yan
Edward C. Hale
By Stevens, Davis, Miller & Mosher
Attorneys Dec. 20, 1960 M. M. YAN ET AL 2,964,792
SYNTHETIC LUMBER PRESSURE SLAM
Filed Oct. 21, 1955 2 Sheets-Sheet 2

Inventors
Maxwell M. Yan
Edward C. Hale
By Stevens Davis Miller & Mosher
Attorneys

United States Patent Office 2,964,792
Patented Dec. 20, 1960

2,964,792

SYNTHETIC LUMBER PRESSURE SLAM

Maxwell Menuhin Yan and Edward C. Hale, Sault Ste. Marie, Ontario, Canada, assignors to Abitibi Power & Paper Company Limited, Iroquois Falls, Ontario, Canada, a corporation of Canada Filed Oct. 21, 1955, Ser. No. 542,005

Claims priority, application Canada Oct. 22, 1954

1 Claim. (Cl. 18—47.5)

This invention relates to a method of making synthetic board, and more particularly to an improvement in the pressing cycle during the consolidation of the mat under heat and pressure.

This invention is concerned with synthetic board formed from particles such as small platelets or splinters of wood together with a small proportion of binder. Where the board is formed from platelets these will have a length of about 0.75 to 1.5 inches, a width of about 0.04 to 0.4 inch, and a thickness of about 0.04 to 0.20 inch. In the case of splinters the length will be 0.25 to 0.75 inch and the diameter 0.015 to 0.125 inch. The binder can be selected from a wide range of natural and synthetic materials. Preferably a fast curing thermosetting synthetic resin, such as urea formaldehyde resin or phenol formaldehyde resin, is used.

In manufacturing the synthetic board, a mat is formed consisting of a layer of wood particles having an appropriate content of binder, each of the particles being coated with a thin layer of uncured binder. This mat is consolidated under heat and pressure to compact the particles, remove the excess moisture and cure the binder, thus producing the finished synthetic board which may, if desired, be subjected to further treatment such as humidification and sanding. During the consolidation, the pressure compacts the particles bringing the surfaces to be glued into intimate contact, and builds up a compression pressure which induces the resin to flow between the particles. This resin flow is essential to the development of a satisfactory bond, as the resin droplets or spots on the individual particles spread and coalesce and resin is squeezed from areas of high to areas of low binder concentration. The heat then polymerizes the resin to a rigid infusible state, thereby producing a satisfactory bond.

Both in the case of a urea formaldehyde resin and a phenol formaldehyde desin a point is reached during the polymerization of the resin at which the resin suddenly thickens and gels. Once this gelation point has been reached, the extent to which the resin will flow will be considerably reduced. The time at which this gelation point occurs is determined by the temperature which affects the rate of reaction and the amount of moisture present. The presence of an increased amount of water will tend to inhibit the polymerization.

Considerable difficulty has been encountered in the past with surface precure, resulting in a surface layer of poorly or non-bonded particles which are easily flaked or abraded off. This condition occurs particularly where rapid curing resins are employed in making medium density synthetic board, that is to say, board in the specific gravity range of 0.45 to 0.75. The heat from the platens reaches the surface layer first, tending to cause gelation of the resin in the surface layer before a sufficient pressure has been reached on closing the press to cause proper flow of the resin in the surface layer and to bring the surfaces to be glued into sufficiently intimate contact. In addition, the heat of the platens rapidly evaporates the moisture at the surface, which tends to advance the time at which the resin at the surface will gel.

Expedients which have previously been tried include the use of an increased total mat moisture, an excess of surface moisture, a reduction of the platen temperatures, the use of slow setting resins, or the use of a cold loose top caul instead of a hot top caul fixed permanently to the hot press platen. These expedients will increase the press times undesirably, and in many cases will give rise to other difficulties. Thus, increasing the moisture will tend to result in steam entrapment and blisters. Sanding the finished product is wasteful, involves an additional step and destroys the esthetic appeal of special decorative surface shavings, when such are used. In particular, sanding will do little to improve the moisture resistance of a poor surface. High frequency heating, resulting in the uniform application of heat throughout the thickness of the board, will overcome the difficulty, but is unnecessarily costly with respect to equipment and electrical power, particularly where a large number of relatively thin boards are to be treated.

The object of this invention is to provide an improved pressing cycle which will substantially overcome surface precure without increasing the pressing time and without the use of costly heating equipment.

In accordance with this invention, heat and an initial pressure are rapidly applied to the mat. The pressure is in excess by a substantial amount of that required to reduce the board to the required caliper. The pressure is attained at a rate such that said initial pressure is reached before appreciable gelation occurs of the resin at the surface of the mat. Shortly before the desired caliper is reached the pressure is reduced so that the board will not be compressed past the desired caliper. Further heat is applied at a reduced pressure to complete the curing of the resin in the mat and the removal of excess moisture. The foregoing method can conveniently be referred to as the "pressure slam" technique.

In the drawings which illustrate the preferred embodiment of this invention:

In accordance with this invention the initial pressure is applied so rapidly that adequate bonding pressure is developed before the gelation of the surface resin occurs. An excess over the pressure which would consolidate the furnish to the desired final density should initially be used, as this will ensure the resin is caused to flow within the board to its correct position for bonding before gelation occurs. Typical pressures for use with panels in the specific gravity range of 0.5 to 0.8 are 200 to 500 p.s.i. It has been found that, in the case of rapid curing urea formaldehyde resins with both platens heated and treating a ½ inch board, a maximum time of about 15 seconds closure to full pressure should be used. As the pressure is applied, the mat offers increasing resistance to compression as shown by a flattening of the curve of caliper plotted against pressure. Eventually a pressure is reached at which the resin will commence to be compressed and spread between the particles. In a typical case this acceptance pressure might be about 50 p.s.i. As the pressure is increased further flow occurs. Subsequently the steady state pressure is reached. This is the pressure which, if maintained, would consolidate the particular furnish to the desired final density. A maximum pressure of at least this value must be used, and it is contemplated, in accordance with the preferred embodiment of this invention, that the initial maximum pressure be appreciably greater than this steady state pressure to give maximum flow of the surface resin and increased compaction of the surface particles before gelation takes place. If this maximum pressure were maintained the caliper of the board would be reduced to less than the desired caliper. The pressure should therefore rapidly be reduced shortly before this caliper is attained so that it does not exceed the steady state pressure at the time that the desired caliper is reached. A low pressure can then be used while additional heat is applied to complete the curing of the binder.

Figure 1:
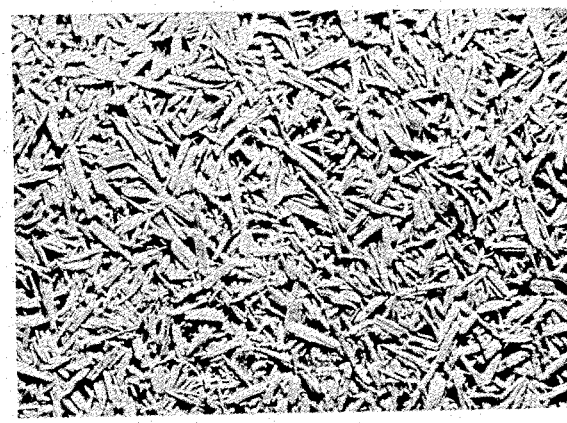
Figure 1 is a photograph of actual size showing a poorly bonded spruce splinter board surface made on a slow closing press.
Figure 2:
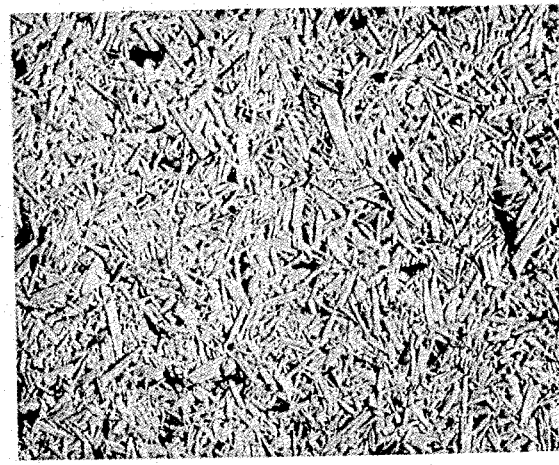
Figure 2 is a photograph similar to Figure 1 but showing a well bonded spruce splinter board surface made on the same press as that used to make the board in Figure 1 but using the pressure slam technique.
Figure 3:
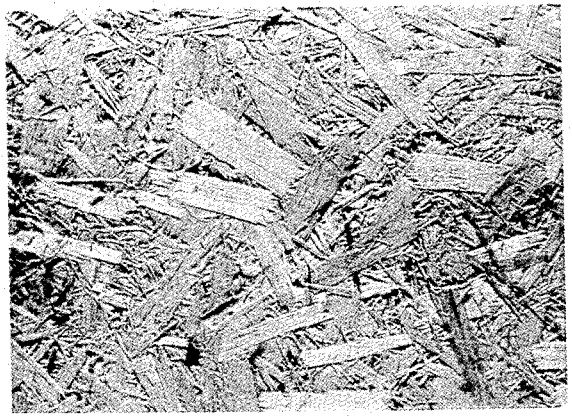
Figure 3 is a photograph of actual size showing a poorly bonded poplar aspen platelet board surface made on a slow closing press.
Figure 4:
Figure 4 is a photograph similar to Figure 3 showing a well bonded poplar aspen platelet board surface made using the pressure slam technique.
Figure 5:
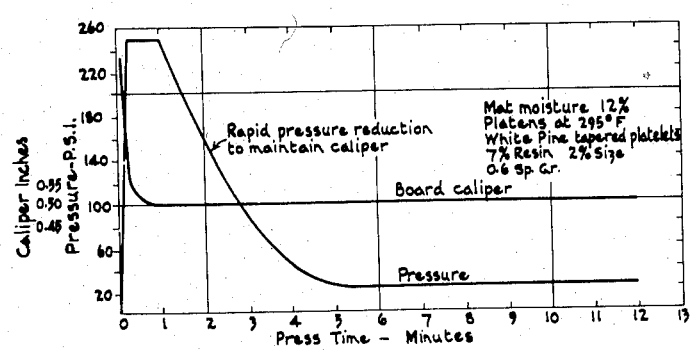
Figure 5 is a plot showing the relationship of caliper and pressure respectively to press time when using the pressure slam technique.

Figures 1 to 4 inclusive illustrate the advantage of using the pressure slam technique to avoid surface defects. The poorly bonded surfaces in Figures 1 and 3 in which the pressure slam technique was not used may be compared with the well bonded surfaces of Figures 2 and 4 obtained using the pressure slam technique. Figure 5 shows the caliper, and pressure respectively plotted against press time for a board of 0.6 specific gravity made from white pine tapered platelets using 7% urea formaldehyde resin and 2% wax size. It will be noted that the initial pressure of 250 p.s.i. was reached in about 15 seconds, maintained for about 45 seconds, and then rapidly reduced before the mat was compressed beyond the desired caliper of 0.5 inch.

The best press cycle for a particular operation will be controlled by several additional factors, including the board thickness, the board density required, the state of the furnish, the wood species, the type of binder and the moisture content and distribution in the mat. In thicker boards heat transfer is reduced and more moisture must be removed, resulting in longer press time. Higher panel density can be achieved by the use of higher pressures or increased mat moisture. Increased pressure will decrease the ease of moisture release because of the greater compaction. It may in some instances be advisable to include a press opening "breathe" to relieve vapours. The state of the furnish refers to the factors contributing to rapid compaction of the furnish with resultant steam entrapment. Thus very smooth particles or precompressed mats will tend to consolidate quickly. In such cases it may be necessary to use a reduced maximum pressure.

Wood species will influence cycle. For example, dense hardwoods such as yellow birch are heated more rapidly, possibly because of their higher heat conductivity. In addition, moisture release from the pad is easier because of the larger formation voids.

Different binders require different curing conditions, and press heating time can be reduced to the point consistent with sufficient board consolidation and rigidity. With the catalysed urea formaldehyde resins usually employed for these synthetic boards, the cure is rapid and is complete when the board centre temperature has reached 225° F. to 230° F. Platen temperatures of 260° F. to 300° F. are normally employed. Phenol formaldehyde resins are also used extensively and their cure required more drastic conditions. A board temperature of approximately 300° F. is required. Platen temperatures of 320° F. to 400° F. are normally employed. A suitable proportion of resin is about 7% of the dry board weight. About 2% of a size such as a wax size can also be used.

For synthetic boards in the specific gravity range of 0.5 to 0.75 a mat moisture of 12½ to 14% is normally recommended. Excessive increase in moisture brings a longer cycle and a greater tendency to blister formation due to steam entrapment. Very low moistures (below 10%) can result in poor resin flow and generally poor gluing conditions. Excess moisture problems can be corrected by decreased platen temperature, reduced rate of initial pressure consolidation, and in some cases by allowing a "breathe" period of low pressure.

The pressure slam technique has been found to present several benefits additional to the avoidance of surface precure. The quick application of heat and pressure to the surface moisture creates a sudden small burst of steam which is driven into the board. Heat conductivity is increased by the rapid rise in board density. The result is more rapid heating and curing of the board interior.

The rapid press closure prevents excessive edge squeeze-out of the furnish by the nature of the rapid compaction preventing excess sidewise movement. The panels therefore require less trim and show superior consolidation towards the edges.

The surface layers of the panel are more highly glazed and densified than the interior of the panel. This results in a tougher surface skin which imparts greater strength and results in superior workability of the corners of the edges.

The pressure slam technique results in higher flexural strength, harder, more resistant surfaces and edges less prone to splitting by nails and screws than those of conventional boards. This improvement is due to the particular density gradient obtained by means of the pressure slam technique. In effect the density distribution represents a low density core sandwiched between high density faces, in contrast to the board prepared under conditions of constant pressure which is of uniform density throughout its caliper. The density distribution differs however from a laminated product or overlay type product in that there is no abrupt change in density. Thus stress concentrations are avoided. In addition the process complications of providing different types of furnish are avoided.

A surprising effect has been noted with respect to tensile strength in a direction perpendicular to the board surface. The normal expectation is that a decrease in density results in a decrease in tensile strength. Accordingly, since the core of a board produced using the pressure slam technique has a lower density than that of a board produced under constant pressure, at the same overall density, it would be expected that there would be a lowering of tensile strengths. Such however is not the case in practice. The properties and density gradient of a board produced by the pressure slam technique are shown in Table I together with the corresponding properties of a board produced by constant pressure methods.

The boards were identical and used the same platelet and chemical furnish. The only difference was in the press technique. In the case of the pressure slam boards shown in Table I an initial pressure of 300 p.s.i. was rapidly applied and held until the caliper was almost reached and then rapidly reduced to a pressure of 150 p.s.i. which was maintained for 20 minutes. The boards shown in Table I as being prepared under constant pressure were pressed at 100 p.s.i. for 20 minutes at 290° F. In each case 0.050″ was removed from each face by sanding, the sanded boards were then sampled and tested in accordance with standard laboratory techniques. The density profile of each board was determined by progressively sanding one surface of 4" by 20" samples, weight and caliper determinations being made at intervals.

*Table I*

| Board Property | Pressure Slam | Constant Pressure |
|---|---|---|
| Caliper | 0.618" | 0.610 in. |
| Specific gravity | 0.58 | 0.62. |
| Modulus of rupture (results corrected to S.G. 0.60). | 3,500 p.s.i. | 2,750 p.s.i. |
| Perpendicular tensile (results corrected to S.G. 0.60). | 81 p.s.i. | 81 p.s.i. |
| Screw holding (results corrected to S.G. 0.60): | | |
| 1 face | 340 lb | 315 lb. |
| 2 edge | 315 lb | 340 lb. |
| Edge splitting | Good | Fair—Good. |

DENSITY GRADIENT

| Sample 1 | | Sample A | |
|---|---|---|---|
| Caliper | Sp. gr. | Caliper | Sp. gr. |
| 0.58 | 0.64 | 0.57 | 0.54 |
| 0.55 | 0.63 | 0.53 | 0.60 |
| 0.51 | 0.55 | 0.49 | 0.57 |
| 0.45 | 0.52 | 0.44 | 0.59 |
| 0.40 | 0.51 | 0.39 | 0.59 |
| 0.36 | 0.50 | 0.33 | 0.56 |
| 0.30 | 0.49 | 0.28 | 0.54 |
| 0.25 | 0.50 | 0.23 | 0.56 |
| 0.19 | 0.50 | 0.19 | 0.61 |
| 0.08 | 0.58 | 0.08 | 0.56 |

| Sample 2 | | Sample B | |
|---|---|---|---|
| Caliper | Sp. gr. | Caliper | Sp. gr. |
| 0.62 | 0.67 | 0.63 | 0.58 |
| 0.59 | 0.60 | 0.59 | 0.59 |
| 0.54 | 0.53 | 0.55 | 0.63 |
| 0.50 | 0.52 | 0.50 | 0.63 |
| 0.40 | 0.49 | 0.38 | 0.63 |
| 0.31 | 0.46 | 0.29 | 0.60 |
| 0.19 | 0.49 | 0.18 | 0.63 |
| 0.13 | 0.53 | 0.11 | 0.62 |
| 0.05 | 0.62 | 0.05 | 0.60 |

| Sample 3 | |
|---|---|
| Caliper | Sp. gr. |
| 0.62 | 0.70 |
| 0.59 | 0.66 |
| 0.54 | 0.53 |
| 0.49 | 0.54 |
| 0.39 | 0.49 |
| 0.30 | 0.47 |
| 0.21 | 0.48 |
| 0.17 | 0.53 |
| 0.06 | 0.60 |

It will be noted that the outermost layers of the board produced by the pressure slam have a density about one-third higher than that of the interior. Some 30% of the thickness has a density exceeding that of the overall board. The latter figure can be altered by the proper choice of the conditions used in the pressure slam.

The primary application of this invention is to medium density boards in the specific gravity range of 0.45 to 0.75 and having a fast curing urea formaldehyde resin binder. The surface resin precure condition has not been as serious with denser products in the specific gravity range of 0.75 to 1.3, as such panels are usually made with slower curing resins such as phenolics which are better suited for the higher pressures necessary for these boards. In its broadest aspect, however, this invention is also applicable to high density boards where fast setting binders are used.

We claim:

A method of consolidating a mat of wood particles combined with approximately 7% by weight of a fast curing thermo-setting synthetic resin binder selected from the group consisting of urea formaldehyde and phenol formaldehyde resins under heat and pressure to provide a synthetic board of a density within the specific gravity range of 0.5 to 0.8, comprising the steps of applying to a mat having a moisture of 12½ to 14% a first stage of pressure wherein the pressure is from about 200 to 500 p.s.i. within less than 15 seconds from closure to full pressure, said mat being heated simultaneously with the application of said first stage of pressure to a temperature at which said thermosetting resin binder cures, maintaining said pressure of said first stage of pressure for approximately 45 seconds and until the desired caliper of the synthetic board has almost been reached and then reducing the pressure to a second stage of pressure of about 150 p.s.i. to avoid compression of the board past the desired caliper and maintaining the reduced pressure of said second stage of pressure and said temperature to complete the curing of the synthetic resin binder and to complete the removal of excess moisture from the mat, said mat being maintained under pressure continuously during said first and second stages of pressure without allowing said mat to expand between said two stages.

References Cited in the file of this patent

UNITED STATES PATENTS

| | | |
|---|---|---|
| Re. 23,829 | Goss | May 18, 1954 |
| 1,812,970 | Mason | July 7, 1931 |
| 1,955,411 | Darrah | Apr. 17, 1934 |
| 2,323,339 | Mason | July 6, 1943 |
| 2,446,304 | Roman | Aug. 3, 1948 |
| 2,544,019 | Heritage | Mar. 6, 1951 |
| 2,571,986 | Hallonquist | Oct. 16, 1951 |
| 2,686,143 | Fahrni | Aug. 10, 1954 |
| 2,700,796 | Roman | Feb. 1, 1955 |
| 2,817,617 | Rogers | Dec. 24, 1957 |